United States Patent [19]

Sakamoto

[11] 4,390,909

[45] Jun. 28, 1983

[54] VIDEO SIGNAL REPRODUCING APPARATUS WITH TAPE TENSION CONTROL ARRANGEMENT

[75] Inventor: Hitoshi Sakamoto, Zama, Japan

[73] Assignee: Sony Corporation, Tokyo, Japan

[21] Appl. No.: 220,100

[22] Filed: Dec. 24, 1980

[30] Foreign Application Priority Data

Dec. 29, 1979 [JP] Japan .................... 54-171746

[51] Int. Cl.$^3$ ............................................. G11B 15/43
[52] U.S. Cl. ................................... 360/71; 360/74.3; 360/96.2
[58] Field of Search .......... 360/71, 70, 73, 74.1–74.3, 360/84, 9–10, 14; 242/198

[56] References Cited

U.S. PATENT DOCUMENTS

| 3,284,084 | 11/1966 | Cooper | 360/74.3 |
| 3,621,149 | 11/1971 | Wada et al. | 360/71 X |
| 4,080,635 | 3/1978 | Zahn et al. | 360/71 |
| 4,161,001 | 7/1979 | Sakamoto | 360/10 |
| 4,309,728 | 1/1982 | Takizawa et al. | 360/74.3 X |

FOREIGN PATENT DOCUMENTS

| 2232035 | 12/1974 | France | 360/71 |
| 52-37021 | 3/1977 | Japan | 360/71 |

*Primary Examiner*—John H. Wolff
*Attorney, Agent, or Firm*—Lewis H. Eslinger; Alvin Sinderbrand

[57] ABSTRACT

A video signal reproducing apparatus of the helical scan type includes a guide drum having a magnetic head fixed thereto for scanning a magnetic tape wrapped about the guide drum, first and second capstan assemblies on opposite sides of the guide drum for moving the tape in a desired mode of operation, a manually rotatable wheel for controlling the speed and direction of movement of the tape in a track searching mode, signal generating apparatus for producing a speed pulse signal having a frequency corresponding to the speed of rotation of the wheel, a flip-flop for producing a direction signal corresponding to the direction of travel of the wheel, a tape tension detector engaging the magnetic tape for detecting the amount of tension on the magnetic tape at a point adjacent the guide drum, a pulse control circuit for producing take-up and supply drive clock pulses in accordance with the amount of tension detected by the tape tension detector and the speed pulse signal, and take-up and supply capstan drive circuits for controlling operation of the first and second capstan assemblies, respectively, in response to the direction signal, the speed signal, and the take-up and supply drive clock pulses, respectively, wherein the tension on the tape as detected by the tape tension detector is controlled to be within respective predetermined ranges during movement of the tape in the forward, reverse and stop modes of operation.

19 Claims, 9 Drawing Figures

FIG. 8

| FIG.8A | FIG.8B |
|---|---|

FIG. 8A

| n | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| A | 1 | 0.989 | 0.957 | 0.905 | 0.835 | 0.75 | 0.655 | 0.552 | 0.448 | 0.345 | 0.25 | 0.165 | 0.095 | 0.043 | 0.011 |
| (APPROX) | 64/64 | 63/64 | 61/64 | 58/64 | 53/64 | 48/64 | 42/64 | 35/64 | 29/64 | 22/64 | 16/64 | 11/64 | 6/64 | 3/64 | 1/64 |
| B | 0.25 | 0.345 | 0.448 | 0.552 | 0.655 | 0.75 | 0.835 | 0.905 | 0.957 | 0.989 | 1 | 0.989 | 0.957 | 0.905 | 0.835 |
| (APPROX) | 16/64 | 22 | 29 | 35 | 42 | 48 | 53 | 58 | 61 | 63 | 64 | 63 | 61 | 58 | 53 |
| | | (HEREAFTER DENOMINATOR OMITTED) | | | | | | | | | | | | | |
| C | 0.25 | 0.165 | 0.095 | 0.043 | 0.011 | 0 | 0.011 | 0.043 | 0.095 | 0.165 | 0.25 | 0.345 | 0.448 | 0.552 | 0.655 |
| (APPROX) | 16/64 | 11 | 6 | 3 | 1 | 0 | 1 | 3 | 6 | 11 | 16 | 22 | 29 | 35 | 42 |
| | | (HEREAFTER DENOMINATOR OMITTED) | | | | | | | | | | | | | |

FIG. 8B

| 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|
| 0 | 0.011 | 0.043 | 0.0095 | 0.165 | 0.25 | 0.345 | 0.448 | 0.552 | 0.655 | 0.75 | 0.835 | 0.905 | 0.957 | 0.989 |
| 0 | 1/64 | 3/64 | 6/64 | 11/64 | 16/64 | 22/64 | 29/64 | 35/64 | 42/64 | 48/64 | 53/64 | 58/64 | 61/64 | 63/64 |
| 0.75 | 0.655 | 0.552 | 0.448 | 0.345 | 0.25 | 0.165 | 0.095 | 0.043 | 0.011 | 0 | 0.011 | 0.043 | 0.095 | 0.165 |
| 48 | 42 | 35 | 29 | 22 | 16 | 11 | 6 | 3 | 1 | 0 | 1 | 3 | 6 | 11 |
| 0.75 | 0.835 | 0.905 | 0.957 | 0.989 | 1 | 0.989 | 0.957 | 0.905 | 0.835 | 0.75 | 0.655 | 0.552 | 0.448 | 0.345 |
| 48 | 53 | 58 | 61 | 63 | 64 | 63 | 61 | 58 | 53 | 48 | 42 | 35 | 29 | 22 |

VIDEO SIGNAL REPRODUCING APPARATUS WITH TAPE TENSION CONTROL ARRANGEMENT

BACKGROUND OF THE INVENTION

1. Field of the Invention

This invention relates generally to apparatus for reproducing video signals recorded on a magnetic tape and, more particularly, is directed to apparatus for reproducing video signals recorded on a magnetic tape of the type having a manual track searching arrangement.

2. Description of the Prior Art

Recent developments with magnetic video tape recorders (VTR) of he helical scan type have enabled the substitution for broadcast purposes of such VTRs for conventional VTRs of the 4-head type. For example, such helical scan type VTRs which use a 1-inch format have even been standardized as type C by the Society of Motion Picture and Television Engineers (SMPTE) in the United States.

One of the reasons for such substitution and an advantage with helicals can type VTRs is that the video signals are recorded in parallel tracks extending obliquely on a magnetic tape with one field of video information being recorded in each track. Consequently, the helical scan type VTR is adapted to reproduce the video signals while operating in various special modes, such as still or stop mode, slow motion mode, fast-forward mode and a reverse slow motion mode. Since the magnetic tape used in the helical scan type VTRs is transported or moved longitudinally between supply and take-up reels, such special modes can be obtained merely by controlling the speed and direction at which the tape is transported between the reels and also controlling the rotation of rotary magnetic heads so that such heads are rotated at the frame frequency. In order for the rotary magnetic heads to accurately scan the parallel tracks at the different speeds, VTRs of the helical scan type have recently been developed in which the rotary magnetic heads are mounted on a deflectable element, such as a piezo-ceramic plate, which is controlled by a control signal based on the reproduced signal for deflecting the position of the heads to accurately scan the parallel tracks on the tape. In this manner, the parallel tracks are accurately scanned in the special reproducing modes so as to obtain a reproduced picture any guard band noise.

Because of such special reproducing modes, the helical scan type VTR is particularly adapted for searching a specific picture or frame from one of the tracks, for example, during an editing operation. In order to perform such searching function, there has recently been developed a helical scan type VTR with a manual operating wheel for controlling the speed and direction of movement of the magnetic tape in dependence on the speed and direction, respectively, of rotational movement of the operating wheel. Such helical scan type VTR was developed by the assignee of this application and is shown more particularly in U.S. Pat. No. 4,161,001, which issued on July 10, 1979. With the apparatus described therein, movement of the magnetic tape can be controlled by the manual operating wheel in a so-called "jog mode" which includes combinations of the special reproducing modes, such as the forward and reverse slow motion modes and the still reproducing mode, so that a particular frame can be located.

It should be appreciated that the accuracy of reproduction of a particular picture will depend, at least in part, by the amount of tension on the tape wrapped about the guide drum of the helical scan type VTR. If the amount of tension on the tape does not correspond to a desired condition, the reproduced output from the rotary magnetic heads do not accurately correspond to the picture recorded on the tape. Even further, in an extreme case, picture deterioration may result in portions of the reproduced picture being dropped entirely. The control of tension on the tape extending about the guide drum thus becomes critical, particularly in the jog mode of operation, for example, when the tape is moved with the following motions, stop→slow motion, and reverse slow motion→stop→forward slow motion. This is because the tension on the tape during such transitional movements also changes and must therefore correspond to desired tensions for the different movements of the tape.

OBJECTS AND SUMMARY OF THE INVENTION

Accordingly, it is an object of this invention to provide a video signal reproducing apparatus with a track searching arrangement that avoids the above-described difficulties encountered with the prior art.

More particularly, it is an object of this invention to provide a video signal reproducing apparatus with a track searching arrangement in which the amount of tension on the tape during various special modes of operation, with particular applicability during the jog mode, is accurately controlled to be within predetermined ranges.

Another object of this invention is to provide a video signal reproducing apparatus with a track searching arrangement in which a capstan assembly is provided on both sides of the guide drum for accurately controlling the tension in the tape during forward, reverse and stop motions and any combination thereof.

In accordance with an aspect of this invention, apparatus for reproducing video signals reproduced on a magnetic tape includes transducer means for reproducing the video signals recorded on the magnetic tape, tape tension adjusting means, preferably comprised of two capstan assemblies on either side of the guide drum of the apparatus, for adjusting the amount of tension on the tape, tape tension detecting means for detecting the amount of tension on the magnetic tape, and tape tension control means for controlling the tape tension adjusting means in response to the amount of tension detected by the tape tension detecting means and the condition of movement of the tape.

The above, and other, objects, features and advantages of the invention, will be apparent in the following detailed description of illustrative embodiments of the invention which is to be read in connection with the accompanying drawings.

BRIEF DESCRIPTION OF THE DRAWINGS

FIGS. 8A and 8B are tables showing amplitude values of the 3-phase drive signal supplied to one of the capstan motors when the speed of rotation of the manual operating wheel is within a predetermined range.

DETAILED DESCRIPTION OF A PREFERRED EMBODIMENT

Figure 1:
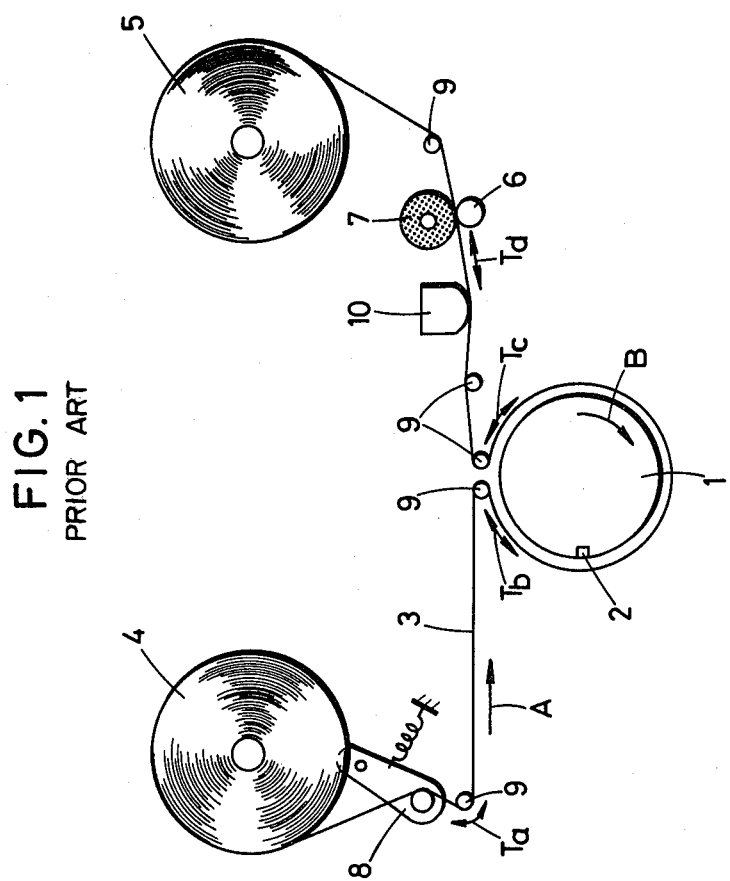
FIG. 1 is a top plan view of a portion of a video tape reproducing apparatus according to the prior art.

Referring to the drawings in detail, and initially to FIG. 1 thereof, there is shown a portion of a video tape reproducing apparatus (VTR) according to the prior art. The VTR of FIG. 1 is of the helical scan type and, more particularly, of the type C format. The apparatus includes a tape guide drum assembly 1 comprised of a lower stationary drum (not shown) and an upper rotational drum having a rotary magnetic head 2 fixed thereto. A magnetic tape 3 is shown to be wound on rotatable supply and take-up reels 4 and 5, and the run of tape 3 between reels 4 and 5 is suitably guided so as to extend helically around the circumferential surface of tape guide 1 about an angle of approximately 340°. In particular, magnetic tape 3 extends across a gap between the upper and lower drums of tape guide drum assembly 1, and rotary magnetic head 2 contacts the tape thereat to record video signals on the tape in successive parallel tracks extending obliquely across the tape. It should be appreciated that, in a helical scan type VTR of the type C format, a SYNC head for providing a SYNC channel and erasing heads are also mounted on the upper rotational drum but are omitted from the description herein as not being directly related to the present invention.

More particularly, magnetic tape 3 extends from supply reel 4, about two tape guides 9, one located adjacent supply reel 4 and the other located at an entrance point of tape guide drum assembly 1. The tape then extends about tape guide drum assembly 1 and exits therefrom about another tape guide 9. From this latter tape guide 9, the tape passes by another tape guide 9, through a capstan assembly comprised of a capstan 6 and a pinch roller 7, and about another tape guide 9 onto take-up reel 5. In the normal or forward reproducing (or recording) mode, capstan 6 and pinch roller 7 transport the tape between supply reel 4 and take-up reel 5 in the direction of arrow A at a predetermined speed, and during such movement of the tape, rotary magnetic head 2 is rotated in the direction of arrow B, for example, at a speed of 60 rps for NTSC video signals, so as to reproduce (or record) video signals which have previously been recorded on the tape in parallel tracks extending obliquely thereon. Further, a stationary auxiliary head apparatus 10 which may, for example, include an audio head and a control signal head, are arranged to contact the magnetic tape extending between tape guide drum assembly 1 and either the supply reel 4 or take-up reel 5, the latter being shown in FIG. 1.

When the tape is running between supply reel 4 and take-up reel 5 in the normal reproducing mode, minimal slack in magnetic tape 3, for example, up to about a few centimeters, can be compensated by a tape tension control apparatus 8 which, as shown in FIG. 1, includes a pivotal spring-biased lever having a pin at its free end about which the tape is guided between supply reel 4 and the first tape guide 9. In this manner, the tension in the tape can be regulated so as to be within the range of several tens of grams to about 100 grams by the tape tension control apparatus 8. It should be appreciated, however, that although the upper rotational drum of tape guide drum assembly 1 is rotated at a speed whereby the outer circumferential speed of the upper drum is greater than 20 meters per second, the frictional force between tape 3 and tape guide drum assembly 1 is negligible as a result of the so-called "air film effect". Thus, any frictional force between magnetic tape 3 and tape guide drum assembly 1 has little or no significance on the slack or variation in tape tension produced during the normal reproducing mode of operation.

For purposes of the present explanation, the vertical reaction force on the tape wrapped about the upper and lower drums is assumed to be uniform. Thus, a mean tape tension $T(\theta)$ at a point on magnetic tape 3 corresponding to a wrap angle $\theta$ from the entrance point of tape guide drum assembly 1 (that is, where the tape first contacts tape guide drum assembly 1), can be expressed by the following equation:

$$T(\theta) = T_0 \times e^{(\mu \times \theta - \frac{\mu \times \theta^2}{2 \times \theta_{max}})} \quad (1)$$

where $T_0$ is the tape tension at the entrance point of tape guide drum assembly 1, $\mu$ is the friction coefficient of the tape on the lower stationary drum and $\theta_{max}$ is the entire angle about which the tape is wrapped about tape guide drum assembly 1, for example, 340° as previously mentioned.

When magnetic tape 3 is moving in the forward direction, that is, in the direction of arrow A in FIG. 1, equation (1) is substantially accurate in defining the tape tension of the tape wrapped about tape guide drum assembly 1. This relationship is shown graphically in FIG. 2 which illustrates the ratio of the tape tension at a wrap angle $\theta$ to the tape tension at the entrance point on tape guide drum assembly 1 for various values of the friction coefficient $\mu$. For example, for a friction coefficient $\mu$ equal to 0.3, the tape tension at the exit point of tape guide drum assembly 1 is approximately 2.5 times greater than the tape tension at the entrance point of the tape guide drum assembly. Although not represented in FIG. 2, the amount of tension on the tape at the capstan assembly is 3 or 4 times greater than the tape tension at the entrance of tape guide drum assembly 1, as a result of viscous air friction and friction between the tape and tape guides 9. Further, in the upper left-hand corner of FIG. 2, there is shown a schematic diagram of the tape guide drum assembly and the tape wrapped thereabout, illustrating the movement of magnetic tape 3 in the forward direction and the associated rotational direction of movement of the upper rotational drum of tape guide drum assembly 1.

Thus, for example, if magnetic tape 3 is driven in the forward direction by the capstan assembly, and assuming that the tape tension $T_a$ at its contact point with tape tension control apparatus 8 is in the range of 70 to 80 grams, the tape tension $T_b$ at the entrance point of tape guide drum assembly 1 becomes about 100 grams, the tape tension $T_c$ at the exit point of tape guide drum assembly 1 becomes approximately 200 to 250 grams, and the tape tension $T_d$ at a location just prior to the capstan assembly becomes approximately 350 to 400 grams, as shown by the respective arrows in FIG. 1. The above tension distribution generally holds true for all tape running speeds when magnetic tape 3 is moving in the forward direction of FIG. 1. However, if the tape is driven in the jog mode, for example, where it is intermittently stopped and moved forward a few frames, the above tape tension relationship at the various locations does not hold true. For example, when movement of the magnetic tape in the forward direction is stopped, the gradient of the tape tension distribution with respect to tape tensions $T_a$, $T_b$, $T_c$ and $T_d$ decreases. Also, when movement of the tape is stopped, the gradient of the tape tension distribution also varies with any external vibration. This, of course, may result in slack in the tape or other undesirable characteristics. Such tension variation thus results in a change in the contact relationship between magnetic tape 3 and rotary magnetic head 2 mounted on the upper rotational drum, thereby resulting in a deterioration in the reproduced picture and a further consequent deterioration in the track following ability of the deflectable piezo-ceramic element supporting rotary magnetic head 2.

Further, when movement of magnetic tape 3 in the forward direction at a slow or normal speed is quickly stopped, the large inertia of supply reel 4 may result in an instantaneous slack in the tape extending between supply reel 4 and take-up reel 5 so that, in such case, reproduction may prove to be impossible. In order to avoid the above-described transient slack in the tape, tape tension control apparatus 8 has been provided, as previously discussed, to maintain the tape tension constant regardless of the slack caused by supply reel 4. Generally, tape tension control apparatus 8 includes a pivotal lever which is designed to have a relatively long stroke or angular displacement for eliminating the transient slack in magnetic tape 3. However, such tape tension control apparatus 8 has proven to be unsatisfactory in failing to cure the problem of rapid changes in the gradient of the tape tension distribution when the tape is stopped. In fact, although tape tension control apparatus 8 removes the slack from the tape, it further deteriorates the tape tension distribution so as to uniformly lower the gradient thereof, further deteriorating reproduction of the picture.

Figure 2:
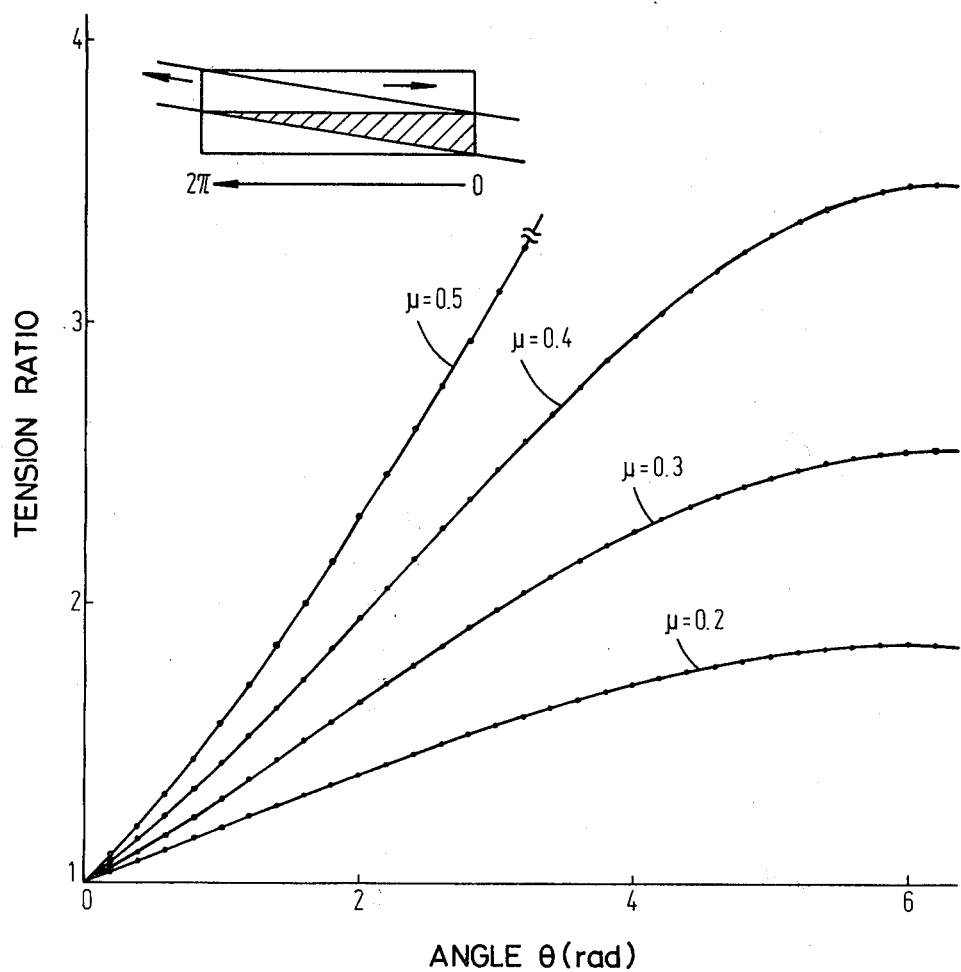
FIG. 2 is a graphical diagram illustrating tension characteristics of the tape which is wrapped about the guide drum in FIG. 1 when the tape is moving in the forward direction.
Figure 3:
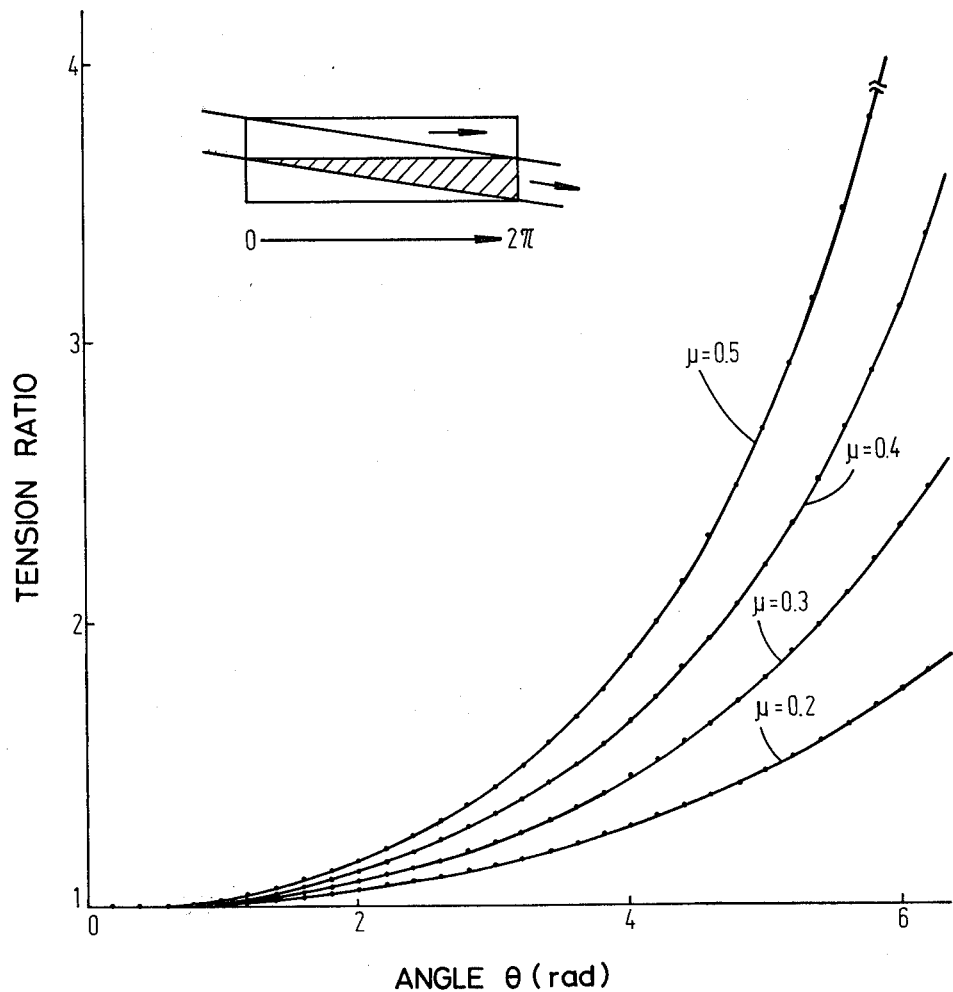
FIG. 3 is a graphical diagram illustrating tension characteristics of the tape which is wrapped about the guide drum in FIG. 1 when the tape is moving in the reverse direction.

When magnetic tape 3 is moving in the reverse direction, that is, in a direction opposite to arrow A in FIG. 1, further problems arise. For reverse movement of magnetic tape 3, the mean tape tension $T'(\theta)$ at a point on the magnetic tape corresponding to a wrap angle $\theta$ from the entrance point (the exit point in the forward direction) of tape guide drum assembly 1 can be expressed by the following equation:

$$T'(\theta) = T_1 \times e^{\frac{\mu \times \theta_2}{2 \times \theta_{max}}}, \quad (2)$$

where $T_1$ is the value of the tape tension at the entrance point of tape guide drum assembly 1 from the reverse direction, that is, the exit point of tape guide drum assembly 1 in the forward direction. Thus, for movement of magnetic tape 3 in the reverse direction, the tape tension at the entrance point on tape guide drum assembly 1 corresponds to tape tension $T_c$ in FIG. 1 while the tape tension at the exit point on tape guide drum assembly 1 corresponds to tape tension $T_b$ in FIG. 1. Further, as was the case with equation (1), the ratio of the tape tension at a wrap angle $\theta$ about tape guide drum assembly 1 to the tape tension at the entrance point on tape guide drum assembly 1 is graphically shown in FIG. 3 for various values of the friction coefficient $\mu$. It should be appreciated that the gradient of the tape tension distribution for movement of the tape in the reverse direction (FIG. 3) is different from that for movement of the tape in the forward direction (FIG. 2) since the tape is helically wrapped about tape guide drum assembly 1, and the relative movement between the upper rotational drum thereof and magnetic tape 3 is different for each case, as shown in the upper left-hand corners of FIGS. 2 and 3. However, the tension ratios at the respective exit points on tape guide drum assembly 1 for the forward and reverse directions of movement of tape 3 are substantially equal to one another, as shown in FIGS. 2 and 3.

When movement of the tape changes from the forward to the reverse direction, the tape tensions $T_a$, $T_b$, $T_c$ and $T_d$ are determined only by tape tension control apparatus 8. For example, assuming that the tape tension $T_a$ is in the range of 70 to 80 grams, during changeover from the forward to reverse directions, the tape tensions $T_b$, $T_c$ and $T_d$ become approximately equal to 50 to 60 grams, 20 to 30 grams and 15 to 20 grams, respectively. In order to prevent such rapid change in the tape tension distribution, it is therefore desirable that a reference bias level for tape tension control apparatus 8 be changed in accordance with the change in direction of magnetic tape 3. However, because of the buffering function of tape tension control apparatus 8, any rapid change in the characteristics of the buffering or biasing action thereof cannot be obtained. This, of course, results in a deterioration of the reproduced picture, particularly in the jog mode of operation.

Figure 4:
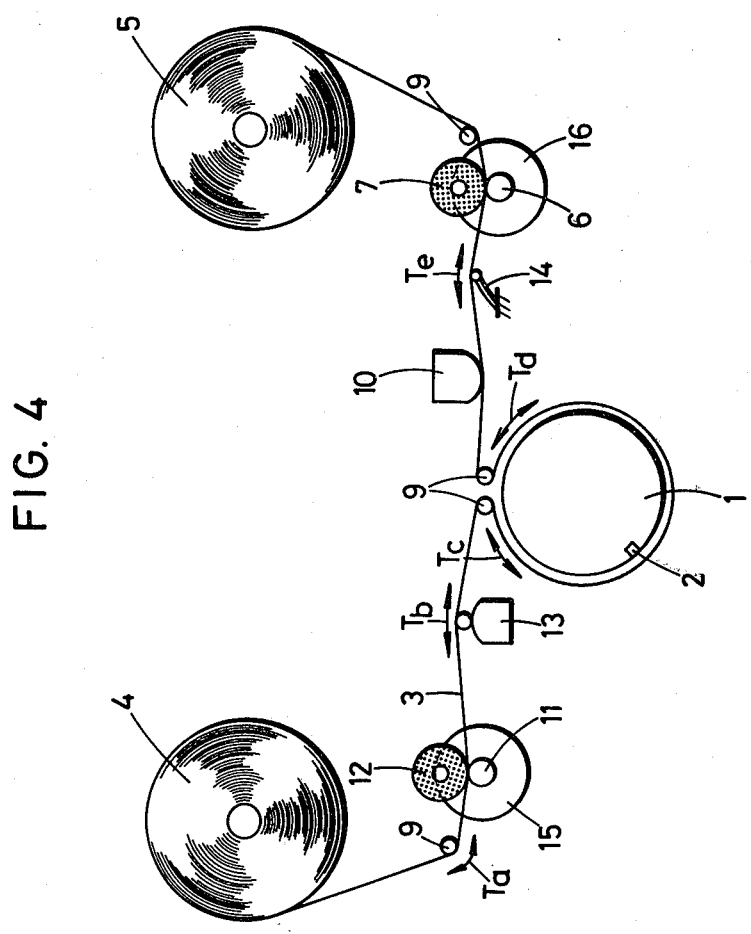
FIG. 4 is a top plan view of a portion of the video tape reproducing apparatus according to this invention.

Referring now to FIG. 4, one embodiment of a VTR of the helical scan type according to this invention will now be described, with elements corresponding to those described above with reference to the prior art VTR of FIG. 1 being identified by the same reference numerals and the description thereof being omitted. In the VTR of FIG. 4, a second capstan assembly is provided between supply reel 4 and tape guide drum assembly 1 and includes a capstan 11 and a pinch roller 12 which is substantially identical to the first capstan assembly comprised of capstan 6 and pinch roller 7. In this manner, a first capstan assembly comprised of capstan 6 and pinch roller 7 is provided on one side of tape guide drum assembly 1 and a second capstan assembly comprised of capstan 11 and pinch roller 12 is provided on the other side of tape guide drum assembly 1 so as to form a so-called closed loop system. The VTR of FIG. 4 further includes tape tension detecting means, that is, a tape tension detector 13 which is shown situated between tape guide drum assembly 1 and the second capstan assembly and is in contact with magnetic tape 3. A resilient compliance arm 14 is also provided between tape guide drum assembly 1 and the first capstan assembly for absorbing or eliminating small amounts of slack in magnetic tape 3, in a similar manner to tape tension control apparatus 8.

Figure 5:
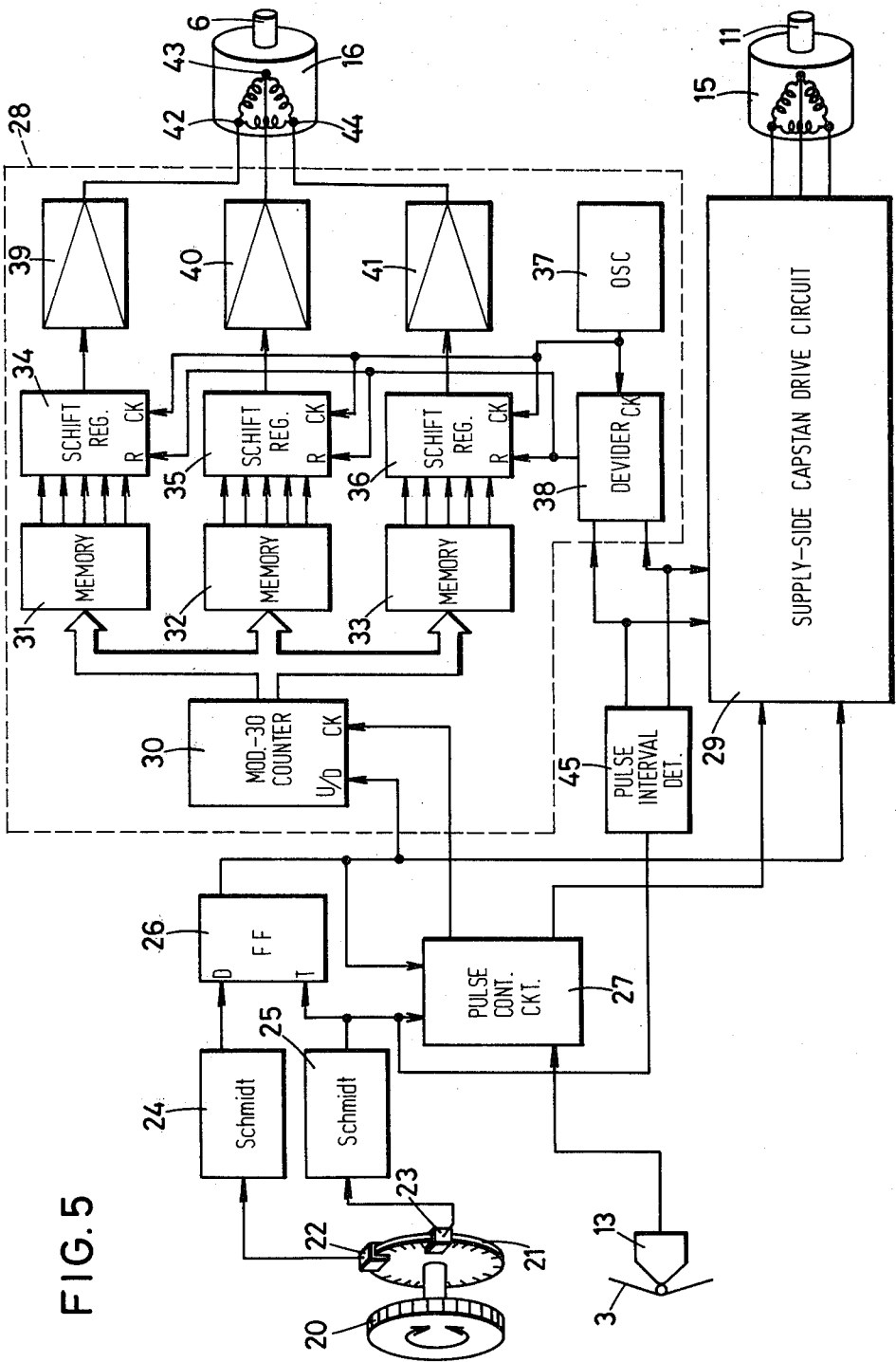
FIG. 5 is a block diagram of a control circuit according to one embodiment of this invention for controlling the capstan assemblies in the apparatus of FIG. 4.

Further, capstan drive motors 15 and 16 are provided for driving capstans 11 and 6, respectively, and may, for example, be 3-phase 8-pole hysteresis motors, as shown in FIG. 5. It should be appreciated that drive motors are also preferably connected to supply reel 4, take-up reel 5 and tape guide drum assembly 1, although such motors are not shown in the drawings of this application as they do not relate directly to the novel aspects of this invention. Capstan motors 15 and 16 are controlled by a control circuit shown in FIG. 5 so as to maintain predetermined tension distributions for the tape in the forward and reverse directions of tape movement, and particularly, during the jog mode of operation.

Referring now to FIG. 5, and as discussed more fully in U.S. Pat. No. 4,161,001, having a common assignee herewith, and the disclosure of which is incorporated herein, the video signal reproducing apparatus includes a track searching mode of operation. In order to control the movement of magnetic tape 3 in such track searching mode of operation, the apparatus embodying this invention includes a manually rotatable wheel or search dial 20 which may be provided with a crank handle (not shown) and is mounted on one end of a shaft which is journalled in substantially friction-free bearings (not shown). A photo or slit disc 21 is further shown to be secured at the other end of the shaft for rotation with search dial 20 and is formed at the outer circumferential portion thereof with spaced apart cut-outs or slits at angularly regular intervals. For example, 60 slits may be formed at angularly regular intervals thereon so as to provide 60 radially directed light shielding portions between successive slits.

Two angularly spaced apart photo-detectors 22 and 23 are associated with slit disc 21 for providing first and second pulse signals of different phases at a frequency dependent on the speed of rotation of search dial 20, with the phase relation of such first and second pulse signals being dependent on the direction of rotation of search dial 20. More particularly, each of photo-detecors 22 and 23 may include a light source at one side of the plane of rotation of slit disc 21 directing a light beam across the outer circumferential portion thereof toward a respective photo-cell or other light-receiving element at the opposite side of such plane of rotation. Thus, when disc 21 is rotated, the light beam emitted from the light source of each photo-detector 22 and 23 and directed toward the respective photo-cell is intermittently blocked by the successive light shielding portions between the slits of disc 21, with the result that each photo-detector 22 and 23 provides an alternating signal or pulses at a frequency corresponding to the rotational speed of disc 21. Furthermore, the angular spacing between photo-detectors 22 and 23 is selected so that the alternating signals or pulses constituting the outputs therefrom will have a phase difference of 90° therebetween.

The alternating or pulse signals from photo-detectors 22 and 23 are applied to Schmitt circuits 24 and 25, respectively, to be wave-shaped by the latter into corresponding rectangular wave signals. The purpose of Schmitt circuits 24 and 25 is to prevent the transmission through subsequent components of the circuit of irregularities in the pulse signals from photo-detectors 22 and 23 that would result from wavering in the rotation of disc 21 caused by uneven manual rotation of search dial 20.

The rectangular wave signals of Schmitt circuits 24 and 25 are respectively applied to the D and T input terminals of a D-type flip-flop circuit 26 which functions as means for detecting the direction of rotation of manually rotatable search dial 20. For example, flip-flop circuit 26 may provide logic level signals "0" and "1" at its Q-output in response to the turning of search dial 20 in the clockwise and counter-clockwise directions, respectively. The Q-output from flip-flop circuit 26 is supplied to a pulse control circuit 27 along with the output of Schmitt circuit 25 (or 24) and the output of tape tension detector 13. The construction and operation of pulse control circuit 27 will be described later with reference to FIG. 6. Pulse control circuit 27, in response to the signals supplied thereto, produces a take-up drive clock signal at one output thereof and a supply drive clock signal at another output thereof which are respectively supplied to a take-up capstan drive circuit 28 for controlling the first capstan assembly and to a supply capstan drive circuit 29 for controlling the second capstan assembly. The take-up and supply capstan drive circuits 28 and 29 supply 3-phase signals to 3-phase capstan motors 16 and 15, respectively, for controlling movement and tension on the tape in the forward and reverse directions. Take-up capstan drive circuit 28, supply capstan drive circuit 29 and pulse control circuit 27 form tape tension control means which controls the capstan assemblies in response to the amount of tension detected by the tape tension detector 13 and the speed and direction of movement of the tape.

Take-up capstan drive circuit 28 and supply capstan drive circuit 29 are substantially identical in construction and accordingly, only take-up capstan drive circuit 28 will be described herein. As shown in FIG. 5, take-up capstan drive circuit 28 includes a mod.-30 up-down counter 30 having a clock input terminal CK supplied with the take-up drive clock signal from pulse control circuit 27 and an up/down input terminal U/D supplied with the Q-output from flip-flop circuit 26. In turn, up-down counter 30 supplies 5-bit output signals in parallel to digital read-only-memories (ROM) 31, 32 and 33 which have values stored therein corresponding to respective amplitudes of the 3-phase sinusoidal wave to be supplied to capstan motor 16. It should be appreciated that the signals stored in ROMs 31, 32 and 33 differ in phase from one another by 120°. Since up-down counter 30 is adapted to count 30 pulses, that is, from 0 to 29, the phase of each of the signals from ROMs 31, 32 and 33 changes by 120° for every 10 pulses of the take-up drive clock signal supplied to up-down counter 30 from pulse control circuit 27.

The outputs from ROMs 31, 32 and 33 are supplied to mod.-64 shift registers 34, 35 and 36, respectively, for forming variable pulse width signals. In particular, each shift register includes a clock input terminal CK supplied with an oscillation signal, for example, having a frequency of about 500 KHz, from an oscillator 37 and a reset input terminal R supplied with a frequency divided output from a frequency dividing counter 38. The oscillation signal from oscillator 37 is also supplied to a clock input terminal CK of frequency dividing counter 38. Each of shift registers 34, 35 and 36 includes 64 stages such that the duty cycle of the signals produced at the outputs of shift registers 34, 35 and 36 are determined by the signals supplied from ROMs 31, 32 and 33, respectively, and the signal supplied to the reset input terminal R thereof from frequency dividing counter 38, as will be hereinafter discussed in greater detail.

Frequency dividing counter 38 is supplied with the output from a pulse interval or width detector 45 which, in turn, is supplied with the output from Schmitt circuit 25. The pulse width of each pulse from Schmitt circuit 25, which is dependent on the speed of rotation of search dial 20, is detected by pulse width detector 45 which supplies an output to frequency dividing counter 38 in accordance with the range within which the speed of rotation of search dial 20 is rotated. For example, when search dial 20 is rotated at a speed corresponding to the range between zero and one-half the normal forward running speed of magnetic tape 3, the frequency dividing ratio of frequency dividing counter 38 is 1/256. In like manner, when search dial 20 is rotated at a speed corresponding to the range between one-half and 1.5 times the normal forward running speed of magnetic tape 3, the frequency dividing ratio of frequency dividing counter 38 is 1/128, and when search dial 20 is rotated at a speed corresponding to the range greater than 1.5 times the normal forward running speed of magnetic tape 3, the frequency dividing ratio of frequency dividing counter is 1/64. It should therefore be appreciated that, for preset values stored in ROMs 31, 32 and 33, the duty cycles of the outputs from shift registers 34, 35 and 36 increases for greater speeds of rotation of search dial 20. For example, if the number "16" is stored in ROM 32, for a count of 0 by up-down counter 30, the duty cycle of the signal from shift register 35 when the frequency-dividing ratio from frequency dividing counter 38 is 1/64 is equal to 0.25. However, when the speed of rotation of search dial 20 is slower so that the frequency dividing ratio of frequency dividing counter 38 is 1/128, the duty cycle of the signal from shift register 35 becomes 0.125. In other words, the level of the voltage supplied to capstan motor 16 is greater for greater rotational speeds of search dial 20 so as to obtain greater running speeds for magnetic tape 3.

Generally, the respective outputs from shift registers 34, 35 and 36 are relatively denoted as A-phase, B-phase and C-phase signals and are expressed by the following equations:

$$A = (\tfrac{1}{2})^z + (\tfrac{1}{2})^z \cos(12° \times n) \quad (3),$$

$$B = (\tfrac{1}{2})^z + (\tfrac{1}{2})^z \cos(12° \times n - 120°) \quad (4),$$

$$C = (\tfrac{1}{2})^z + (\tfrac{1}{2})^z \cos(12° \times n - 240°) \quad (5),$$

where n corresponds to the counted value by up-down counter 30, which varies from 0 to 29, and z is equal to 1, 2 and 3 for dividing ratios from frequency dividing counter 38 of 1/64, 1/128, and 1/256, respectively. Thus, for example, for a dividing ratio of 1/64 with z equal to 1, the respective values for equations (3)-(5) have been calculated for the 30 counted values n of up-down counter 30, as shown in the respective upper columns in FIG. 8. Approximate values corresponding to the values in the upper columns are shown in the respective lower columns in FIG. 8 for the A-phase, B-phase and C-phase signals as fractions having a common denominator equal to 64 and the numerators thereof corresponding to values stored in ROMs 31, 32 and 33 for counted values of n equal to 0 to 29. For example, for n=0, the number "64" is stored in ROM 31 so that the output of shift register 34 is equal to "1" for the A-phase signal at this time. For the B-phase signal, the number "16" is stored in ROM 32 corresponding to a counted value n=0. In other words, for a dividing ratio of 1/64, the output of shift register 35 is at logic level "1" during a time corresponding to 16 of the 64 clocks from oscillator 37 and at logic level "0" during the remaining ones of the 64 clock pulses from oscillator 37. It should therefore be appreciated, as previously discussed, that the duty cycle for the signal from shift register 35 is 0.25. For a counted value n=0, the number "16" is stored in ROM 33 and accordingly, the amplitude of the output signal from shift register 36 is equal to that from shift register 35 although differing in phase by 120°.

The output signals from shift registers 34, 35 and 36 are supplied through power switching amplifiers 39, 40 and 41 to connecting terminals 42, 43 and 44, respectively, of the delta-connected windings of capstan motor 16. It should be appreciated that the rotational position of motor 16 is determined by the vector composition of the outputs from shift registers 34, 35 and 36, that is, from a combination of the A-phase, B-phase and C-phase signals. Since one circulation of the count by counter 30 corresponds to a 360° electrical angle of capstan motor 16, the direction of the vector composition applied to the windings of capstan motor 16 changes for every count by counter 30, that is, for every electrical angle of 12°, whereas the rotational direction of the vector composition and accordingly, the rotational direction of capstan motor 16, is determined by the counting direction of counter 30.

It should be appreciated from the above that, since the frequency dividing ratio of frequency dividing counter 38 is the same for each of shift registers 34, 35 and 36, the relative phase relationship between the signals supplied to connecting terminals 42, 43 and 44 remains the same regardless of the specific frequency dividing ratio utilized. The frequency dividing ratio is merely used to change the speed of rotation of capstan motor 16 and accordingly, of the tape running speed. For example, for higher speeds of rotation of search dial 20, a lower frequency dividing ratio is used, for example, 1/64, so that the duty cycle of the signal from shift registers 34, 35 and 36 increases with a consequent increase in the level of the signals supplied to capstan motor 16. This, of course, results in an increase in running speed of magnetic tape 3. It should be appreciated that shift registers 34, 35 and 36 therefore effect a sort of digital-to-analog conversion and accordingly, a conventional digital-to-analog (D/A) converter may also be utilized. Also, rather than utilizing frequency-dividing counter 38 for controlling the absolute value of the drive voltage supplied to the windings of capstan motor 16, power switching amplifiers 39, 40 and 41 may be controlled to regulate such drive voltage. It should also be appreciated that, although the take-up capstan drive circuit 28 has been described in detail, supply capstan drive circuit 29 is effectively equivalent thereto in construction and function.

Figure 6:
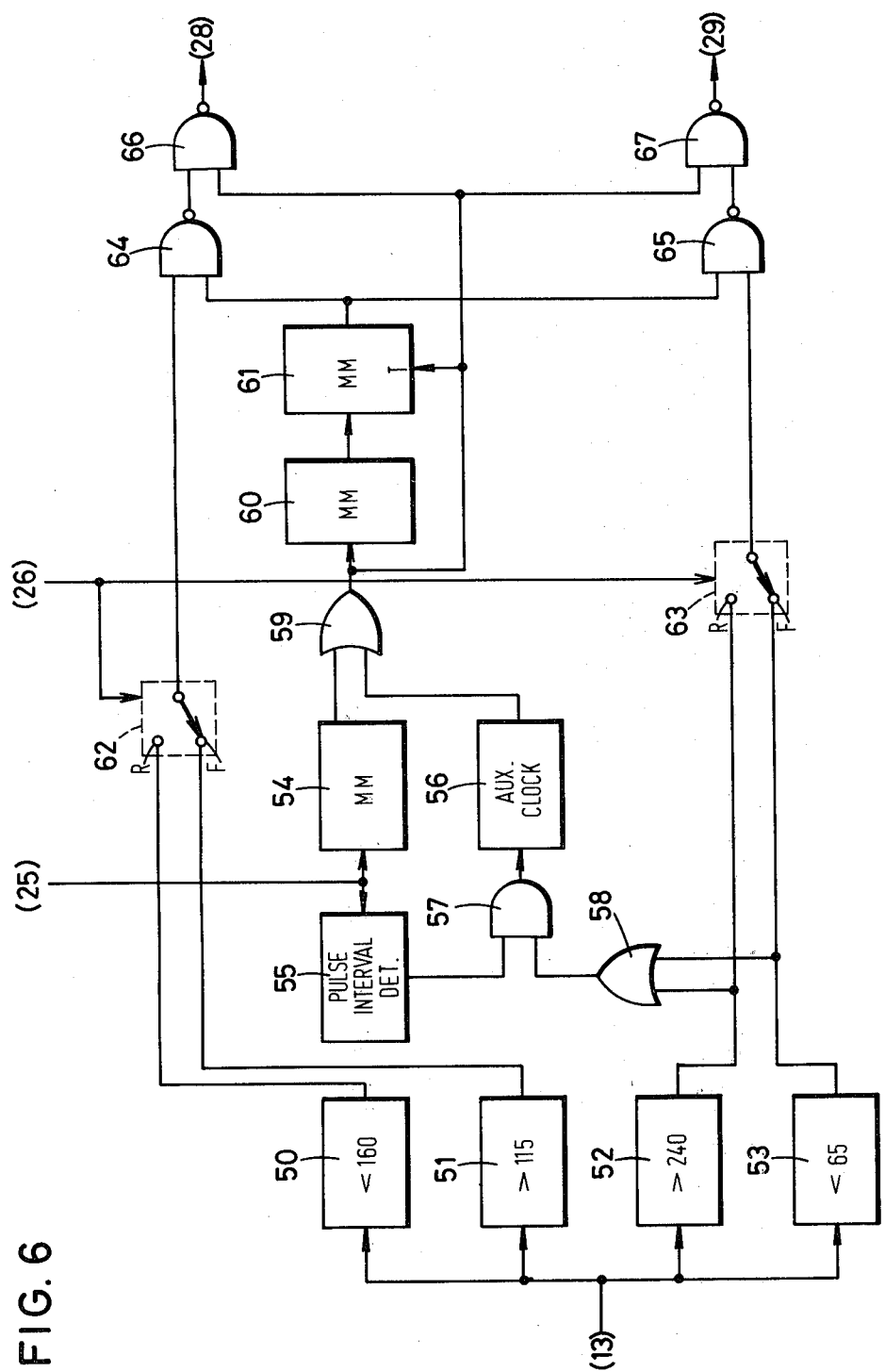
FIG. 6 is a block diagram of the pulse width detecting circuit of FIG. 5.

Turning now to FIG. 6, one embodiment of a pulse control circuit 27 that can be utilized in the circuitry of FIG. 5 is shown to include four range setting circuits 50, 51, 52 and 53, each supplied with an output from tape tension detector 13. As will be appreciated from the discussion hereinafter, range setting circuit 50 generates a logic level "1" output when the tape tension detected by tape tension detector 13 is less than 160 grams, and generates a logic level "0" output when the detected tape tension is greater than or equal to 160 grams. In like manner, when the tape tensions detected by tape tension detector 13 are greater than 115 grams, greater than 240 grams and less than 65 grams, range setting circuits 51, 52 and 53 generate logic level "1"

outputs, respectively, and these circuits generate logic level "0" outputs at all other times.

It has been determined that, for forward movement of magnetic tape 3, the tension detected by tape tension detector 13 should be within the range of 65 to 115 grams while, for movement in the reverse direction, the tape tension should be within the range of 160 to 240 grams. In this manner, range setting circuit 50 is connected to the fixed R contact of a single-pole, double-throw switch 62 having its movable arm connected to one input of a NAND gate 64. In like manner, the output from range setting circuit 51 is connected to the F contact of switch 62 to be supplied to NAND gate 64. Also, the output of range setting circuits 52 and 53 are connected to the R and F contacts, respectively, of a single-pole, double-throw switch 63 which is adapted to connect one of the outputs to a NAND gate 65. It should be appreciated that although switches 62 and 63 are shown as single-pole, double-throw switches, preferably such switches are of the semiconductor gating type. Switches 62 and 63 are controlled by the Q-output of flip-flop circuit 26 which changes over the switches in accordance with the direction of movement of magnetic tape 3. For example, when magnetic tape 3 is moving in the forward direction, switches 62 and 63 are changed over to the F contacts so that the outputs of range setting circuits 51 and 53, corresponding to the forward tension range of the tape, are supplied to NAND gates 64 and 65, respectively.

Further, pulse control circuit 27 includes a monostable multivibrator 54 and a pulse width or interval detector 55, each supplied with the output from Schmitt circuit 25, hereinafter referred to as the jog clock signal. In particular, monostable multivibrator 54 generates pulses having a 0.3 msec. duration in synchronization with the jog clock signal and supplies these pulses to one input of an OR gate 59. Pulse width detector 55 detects whether the period of the jog clock signal is longer than 0.2 seconds and supplies a corresponding signal to an input of an AND gate 57 in response thereto. It should be appreciated that when the period of the jog clock signal is greater than 0.2 seconds, magnetic tape 3 is effectively stopped and therefore, pulse control circuit 27 functions in the stop mode of operation. Further, when magnetic tape 3 is stopped from moving in either the forward or reverse running direction, the tension on the tape may be either less than 65 grams or greater than 240 grams, respectively. In this manner, range setting circuits 52 and 53 are each connected to an input of an OR gate 58 which, in turn, supplies an output therefrom to another input of AND gate 57. Thus, AND gate 57 effectively detects when magnetic tape 3 is stopped and supplies a respective signal to an auxiliary clock generator 56 which, in response thereto, generates auxiliary clock pulses having a 0.3 msec. pulse width with a 0.3 second interval between successive pulses. The auxiliary clock pulses are supplied to the other input of OR gate 59 and thus, the outputs of auxiliary clock generator 56 and monostable multivibrator 54 are supplied through OR gate 59 as drive clock pulses to a monostable multivibrator 60 and to the trigger input T of a monostable multivibrator 61 having its input connected to the output of monostable multivibrator 60. Monostable multivibrator 60 functions to determine the sampling period for the drive clock pulses from OR circuit 59, for example, 0.3 seconds, and multivibrator 61 functions to convert the drive clock pulses from OR gate 59 into sampling clock pulses of 0.3 msec. It should be appreciated that the output from monostable multivibrator 61 is synchronized with the output of OR gate 59 and accordingly, with the auxiliary clock pulses from auxiliary clock generator 56.

The output from multivibrator 61 is supplied to respective inputs of NAND gates 64 and 65 which, as previously discussed, are also supplied with the outputs from switches 62 and 63, respectively. The outputs from NAND gates 64 and 65 are supplied to one input of a NAND gate 66 and a NAND gate 67, respectively, which have supplied to another input thereof the drive clock pulses from OR gate 59. In this manner, the drive clock pulses from OR gate 59 are sampled through NAND gate 56 and supplied as the take-up drive clock signal to up-down counter 30 of take-up capstan drive circuit 28. In like manner, the drive clock pulses from OR gate 59 are sampled through NAND gate 67 so as to supply the supply drive clock signal to the respective up-down counter of supply capstan drive circuit 29 as the clock pulse therefor. Thus, the negative-going or falling edges of the pulses from the take-up and supply drive clock signals are used at the clock input terminals CK of up-down counters 30 of take-up and supply capstan drive circuits 28 and 29.

In operation, search dial 20 is rotated at a desired speed and, in response thereto, D-type flip-flop circuit 26 produces a Q-output signal corresponding to the rotational direction of search dial 20 and Schmitt circuit 25 produces a jog clock pulse corresponding to the rotational speed thereof. Generally, capstan motors 15 and 16 are rotated 720 ($2 \times 360$) electrical degrees for every revolution of search dial 20, and are rotated 180 positional degrees for every rotation of search dial 20. In other words, capstan motors 15 and 16 are rotated 3 positional degrees for every rotation of search dial 20 corresponding to the distance between adjacent slits thereon, the value of 3 degrees being determined as the resolving power necessary for fine control of the tape tension within the closed tape loop. However, because the 3-phase polypole motor cannot be directly driven in a stepwise manner with the required resolving power, capstan drive circuits 28 and 29 are provided to effect such stepwise drive at the resolving power of 3 positional degrees. In this manner, each 360 degree electrical angle is divided into 30 parts by up-down counter 30 with the voltages supplied to capstan motors 15 and 16 corresponding to sinusoidal waves with a phase relationship of $\sin(12° \times n)$, $\sin(12° \times n - 120°)$ and $\sin(12° \times n - 240°)$ and which are modulated so as to form variable pulse width signals dependent on the speed of rotation of the motors. In this manner, the 3-phase vector composition, that is, the outputs from drive circuits 28 and 29, are rotated in a stepwise manner every 12 electrical degrees (3 positional degrees).

Further, by means of pulse control circuit 27, the stepwise rotations of capstans 6 and 11 are equal to one another so as to transport magnetic tape 3 in the same direction and for the same length. In other words, when magnetic tape 3 is driven for a very short time, such as in the jog mode, the length of the tape extending between the two capstan assemblies and wrapped about tape guide drum assembly 1 does not change. Accordingly, the present invention eliminates any slack or extraordinary tension in magnetic tape 3, particularly in the jog mode of operation. Further, during normal movement of the tape, the tape tensions at the entrance and exit sides of each capstan assembly are different from one another and accordingly, there results a difference in movement (speed) of the magnetic tape at such positions due to a so-called "creep-slip" caused by the elasticity of the magnetic tape. Thus, when magnetic tape 3 is driven for a long time, the tension on the tape extending between the two capstan assemblies gradually changes. Also, there is a rapid change in the tension on the tape during change-over in the direction of movement of the tape as a result of changes in the direction of the frictional forces thereon. Such changes in tape tension are compensated for by pulse control circuit 27 (FIG. 6). It should therefore be appreciated that the tension on the tape extending between the capstan assemblies and around tape guide drum assembly 1 remains substantially constant during the jog mode of operation and also during normal modes of operation.

Figure 7:
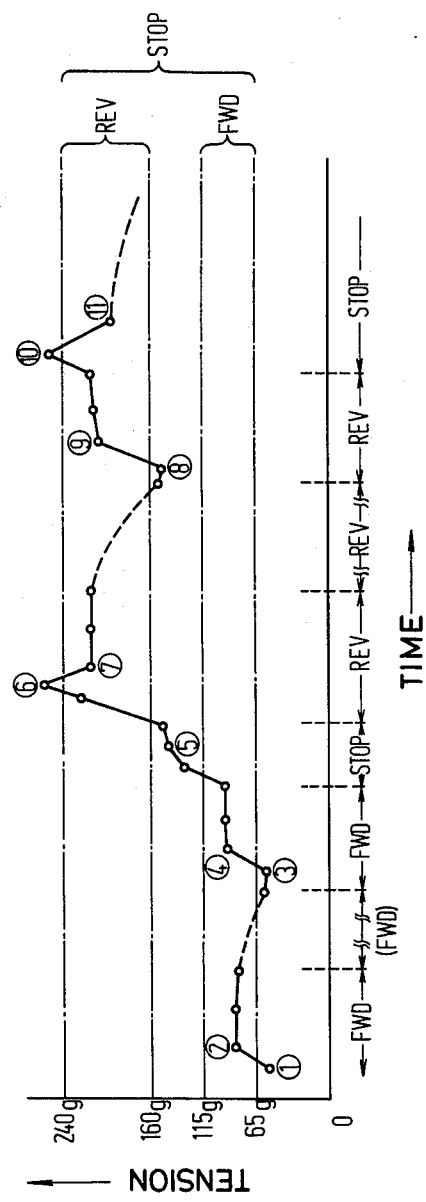
FIG. 7 is a graphical diagram illustrating a tension characteristic of the tape when the tape is moving in the jog mode in the apparatus of FIG. 5.

Referring now to FIG. 7, a more detailed operation of this invention will be described. Assuming that the tension detected by tape tension detector 13 is initially less than 65 grams in the stop mode, as indicated by point 1 in FIG. 7, if search dial 20 is then rotated in the forward direction in order to locate a particular frame, switches 62 and 63 are switched over to their F contacts. At this time, since the tension on the tape is detected as being less than 65 grams, range setting circuit 53 supplies a logic level "1" signal to NAND gate 65 and range setting circuit 51 supplies a logic level "0" signal to NAND gate 64. In this manner, a take-up drive clock pulse is supplied by NAND gate 66 to up-down counter 30 of capstan drive circuit 28 so that capstan motor 16 is rotated one step. However, no clock pulse is supplied to capstan drive circuit 29 so that capstan motor 15 is not driven by the same one step. In this manner, the tape is only driven by capstan drive motor 16 to bring the tape tension within the range of 65 to 115 grams, as indicated by point 2 in FIG. 7. Thereafter, with the tape tension being in the required range of 65 to 115 grams, NAND gates 66 and 67 each generate take-up and supply drive clock pulses, respectively, which are supplied to capstan drive circuits 28 and 29 to drive capstan motors 16 and 15, respectively, an equal amount. Further, the drive directions of these motors are the same and are determined by the Q-output from flip-flop circuit 26 supplied to the up-down inputs U/D of counters 30 in drive circuits 28 and 29. If the tape tension, at some later time, becomes less than 65 grams, as indicated at point 3 in FIG. 7, one clock pulse is eliminated from the supply drive clock pulses supplied from pulse control circuit 27 until the tape tension returns to the desired range, as shown at point 4 in FIG. 7.

It should be appreciated that since the interval between pulses from pulse control circuit 27 is 0.3 seconds, capstan motors 15 and 16 cannot be over driven. In other words, the change of tape tension for each clock pulse is determined by the compliance of tape between capstans 6 and 11 and the step angle of movement thereof. If, for example, the diameter of each capstan 6 and 11 is 8 mm, each pulse from pulse control circuit 27 results in a length of 0.21 mm of tape being transported. In order to ensure proper tape compliance, the tape compliance of compliance arm 14 is designed to be about one-half of 50 grams (115−65=50 grams). In regard to the step angle, when magnetic tape 3 is moved at a slow rate of speed, no problem results in providing tape tension correction. However, when magnetic tape 3 is transported at a fast rate of speed, the interval between clock pulses, as determined from Schmitt trigger 25, is short so that the correction operation may be unstable. In this regard, monostable multivibrator 60 provides a sampling period of 0.3 seconds regardless of the rate of speed of magnetic tape 3. In this manner, overcompensation of an incorrect tape tension is prevented.

Referring back to FIG. 7, when rotation of search dial 20 is stopped from moving in the forward direction, as indicated by point 5 in FIG. 7, the tension on the tape is detected to be greater than 115 grams. However, in the stop mode, Schmitt trigger 25 does not provide any pulses so that monostable multivibrator 54 also does not produce any output. However, auxiliary clock generator 56 produces pulses of 0.3 msec. duration with an interval therebetween of 0.3 seconds, as previously discussed, if two conditions are present, namely, that the interval between pulses from Schmitt trigger 25 is detected to be greater than 0.2 seconds by pulse width detector 55 and the detected tension is beyond the range of 65 to 240 grams. As shown at point 5 in FIG. 7, the tape tension is within the range of 65 to 240 grams so that no pulses are generated by auxiliary clock generator 56. In other words, it is unnecessary to continually make adjustments to the tape when the VTR is acting in its stop mode. Thus, it is necessary to provide a larger dead region for the stop mode than that for the tape running modes.

If search dial 20 is rotated in the reverse direction from the stop condition at point 5, the tension on the tape immediately increases. If the tension detected by tape tension detector 13 is greater than 240 grams, as shown by point 6 in FIG. 7, a supply drive clock pulse is eliminated so that capstan motor 16 rotates one step in the reverse direction and capstan motor 15 is not driven at all for that step. Thus, the length of the tape between the two capstan assemblies is increased so as to reduce the tension on the tape to less than 240 grams, as indicated by point 7 in FIG. 7. The tape is thereafter driven in the reverse direction until the tension, for example, becomes less than 160 grams, as shown at point 8 in FIG. 7. At such time, pulse control circuit 27 functions to remove or eliminate one take-up drive clock pulse so that during the continual rotation of motors 15 and 16, motor 16 is not driven for one step while motor 15 is driven for that same step in the reverse direction. Accordingly, the tension on the tape is increased to a point 9 as shown in FIG. 7 within the range of 160 to 240 grams.

If rotation of search dial 20 is thereafter stopped so as to also stop movement of magnetic tape 3, the tension on the tape detected by tape tension detector 13 becomes greater than 240 grams, as indicated by point 10 in FIG. 7. Accordingly, NAND gate 66 generates a take-up drive clock pulse at such time, while NAND gate 67 produces no corresponding supply drive clock pulse. Thus, capstan motor 16 is driven and capstan motor 15 is not driven so as to lower the tension on the tape as indicated by point 11 in FIG. 7, whereby the tension on the tape is brought within the range of 160 to 240 grams. It should be appreciated that the tape tension distribution shown in FIG. 7 is only one example of an operating condition therefor for explanation purposes only.

It should be appreciated that various modifications may be made within the scope of this invention as defined by the claims of this application. For example, although AC synchronous motors have been utilized for the capstan motors 15 and 16, DC motors may be used in place thereof with appropriate circuitry. In such case, a unit speed drive pulse per unit time may be supplied to the DC motors to effect the above-described control. Further, although the present invention has been described with respect to a speed dial for use particularly in the jog mode of operation, a control system in which a joy stick is employed may be utilized in place thereof. In such case, a speed pulse generator corresponding to the designated speed may be employed with the invention.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Apparatus for reproducing video signals recorded on a magnetic tape, comprising:
   transducer means for reproducing the video signals recorded on said magnetic tape;
   capstan assembly means for adjusting the amount of tension on said magnetic tape;
   tape tension detecting means for detecting the amount of tension on said magnetic tape; and
   tape tension control means for controlling said capstan assembly means to maintain the tension on said magnetic tape within a predetermined range in response to the amount of tension detected by said tape tension detecting means and the speed and direction of movement of said magnetic tape.

2. Apparatus according to claim 1; in which said tape is wound on supply and take-up reels, and said transducer means scans the tape at a run thereof intermediate said reels; said capstan assembly means includes a first capstan assembly engageable with said run of tape intermediate the reels on one side of said transducer means, and a second capstan assembly engageable with said run of tape intermediate the reels on the other side of said transducer means; and said tape tension control means is operative to control said first and second capstan assemblies so as to maintain the tension on said tape within said predetermined range.

3. Apparatus according to claim 2; in which said first capstan assembly includes a first capstan engageable with said run of tape, first capstan drive means for rotating said first capstan, and a first pinch roller operative to press said tape against said first capstan for transport of the tape by the first capstan; and said second capstan assembly includes a second capstan engageable with said run of tape, second capstan drive means for rotating said second capstan, and a second pinch roller operative to press said tape against said second capstan for transport of the tape by the second capstan.

4. Apparatus according to claim 3; in which each of said first and second capstan drive means includes a 3-phase AC motor.

5. Apparatus according to claim 2; further including a rotatable guide drum assembly about which said run of tape is at least partially wrapped; and in which said transducer means includes at least one magnetic head secured to said rotatable guide drum assembly and adapted to rotate therewith.

6. Apparatus according to claim 1; further including a manually rotatable wheel; and in which said tape tension control means includes rotation detecting means for detecting at least the speed of rotation of said manually rotatable wheel, pulse control means for generating a pulse control signal in response to the amount of tension detected by said tape tension detecting means and at least the speed of rotation detected by said rotation detecting means, and drive means for controlling said capstan assembly means in response to said pulse control signal.

7. Apparatus according to claim 6; in which said rotation detecting means includes first and second signal generating means producing first and second pulse signals at a frequency dependent on the speed of rotation of said wheel.

8. Apparatus according to claim 7; in which said tape tension control means includes disc means rotatably coupled with said manually rotatable wheel and having an outer circumferential portion thereof with slits angularly disposed thereabout, said first signal generating means includes first photo-detector means associated with the outer circumferential portion of said disc and first Schmitt circuit means for producing said first pulse signal in response to said first photo-detector means, and said second signal generating means includes second photo-detector means associated with the outer circumferential portion of said disc and second Schmitt circuit means for producing said second pulse signal in response to said second photo-detector means.

9. Apparatus according to claim 7; in which said first and second pulse signals are of a different phase from one another with the phase relation therebetween being dependent on the direction of rotation of said wheel, and said rotation detecting means includes direction detecting means for producing an output corresponding to the direction of rotation of said wheel in response to said first and second pulse signals.

10. Apparatus according to claim 9; in which said direction detecting means includes a D-type flip-flop circuit having a D input terminal supplied with said first pulse signal and a T input terminal supplied with said second pulse signal.

11. Apparatus according to claim 6; in which said pulse control means includes range setting means for determining whether the amount of tension detected by said tension detecting means falls within at least one predetermined range and for producing an output in response thereto, clock generating means for generating clock pulses of a predetermined duration, and gating means for producing said pulse control signal in response to said clock pulses of a predetermined duration and said output of said range setting means.

12. Apparatus according to claim 11; in which said range setting means includes a first pair of range setting circuits defining an upper limit and a lower limit, respectively, of a first predetermined range within which the detected amount of tension by said tape tension detecting means is desired to be situated during movement of the tape in the forward direction, and a second pair of range setting circuits defining an upper limit and a lower limit, respectively, of a second predetermined range within which the detected amount of tension by said tape tension detecting means is desired to be situated during movement of the tape in the reverse direction, with the range setting circuits defining the lowest limit and the highest limit defining a third predetermined range within which the detected amount of tension by said tape tension detecting means is desired to be situated during no movement of the tape.

13. Apparatus according to claim 11; in which said clock generating means includes first pulse generating means for producing first pulses of a predetermined duration in response to said rotation detecting means during rotation of said wheel, second pulse generating means for producing second pulses of a predetermined duration in response to said rotation detecting means when said wheel is effectively not rotating and to said range setting means when the amount of tension detected on said tape by said tape tension detecting means is not within a predetermined range, and third pulse generating means for generating said clock pulses of a predetermined duration with at least a predetermined interval therebetween in response to said first and second pulses.

14. Apparatus according to claim 13; in which said rotation detecting means produces a speed pulse signal in response to the detection of the speed of rotation of said manually rotatable wheel; said first pulse generating means includes first multivibrator means for producing said first pulses in response to said speed pulse signal; said second pulse generating means includes pulse width detecting means for detecting whether the duration of each pulse of said speed pulse signal is greater than a predetermined value and for producing a pulse width detected output in response thereto, first gating means for determining whether the amount of tension on said tape exceeds said predetermined range and for producing a range exceeding output in response thereto, second gating means for producing an output in response to said range exceeding output and said pulse width detected output only when the amount of tension on said tape exceeds said predetermined range and when the duration of each pulse of said speed pulse signal is greater than said predetermined value, and auxiliary clock generating means for generating said second pulses in response to said output of said second gating means; and said third pulse generating means includes second multivibrator means for determining the sampling period of said first and second pulses and third multivibrator means for generating said clock pulses in response to an output of said second multivibrator means and said first and second pulses.

15. Apparatus according to claim 11; in which said tape is wound on supply and take-up reels, and said transducer means scans the tape at a run thereof intermediate said reels; said capstan assembly means includes first and second capstan assemblies engageable with said run of tape intermediate the reels on opposite sides of said transducer means; said drive means includes first and second drive circuits for controlling said first and second capstan assemblies so as to adjust the tension on said tape; and said gating means includes first and second gating circuits for supplying said pulse control signal to said first and second capstan assemblies, respectively, in response to said output from said range setting means and to said clock pulses.

16. Apparatus according to claim 6; in which said tape is wound on supply and take-up reels, and said transducer means scans the tape at a run thereof intermediate said reels; said capstan assembly means includes a first capstan assembly having a first capstan engageable with said run of tape intermediate the reels on one side of said transducer means and a first capstan drive device for rotating said first capstan; and said drive means includes counter means for generating a count at a predetermined speed and direction in response to said rotation detecting means and said pulse control means, memory means for producing an output in response to said count by said counter means, and level varying means for varying the level of said output from said memory means in response to the speed of rotation of said wheel and for supplying said varied level output to said first capstan drive device.

17. Apparatus according to claim 16; in which said counter means includes a first up-down counter having a clock input terminal supplied with said pulse control signal and an UP/DOWN input terminal supplied with an output from said rotation detecting means corresponding to the direction of rotation of said wheel, said memory means includes a first set of first, second and third read only memory circuits, each supplying a different output in accordance with the count from said first counter, and said level varying means includes an oscillator for generating an oscillation signal, a frequency dividing counter for producing a frequency divided output as a function of which of a plurality of predetermined ranges the speed of rotation of said wheel falls, and a first set of first, second and third shift registers supplied with the outputs from said first set of first, second and third read only memory circuits, respectively, and each having a clock input terminal supplied with said oscillation signal and a reset input terminal supplied with said frequency divided output, said first set of shift registers supplying a varied level output to said first capstan drive device.

18. Apparatus according to claim 17; further including a second capstan assembly having a second capstan engageable with said run of tape intermediate the reels on the other side of said transducer means and a second capstan drive device for rotating said second capstan; said counter means includes a second up-down counter having a clock input terminal supplied with said pulse control signal and an UP/DOWN input terminal supplied with an output from said rotation detecting means corresponding to the direction of rotation of said wheel, said memory means includes a second set of first, second and third read only memory circuits, each supplying a different output in accordance with the count from said second counter, and said level varying means includes a second set of first, second and third shift registers supplied with the outputs from said second set of first, second and third read only memory circuits, respectively, and each having a clock input terminal supplied with said oscillation signal and a reset input terminal supplied with said frequency divided output, said second set of shift registers supplying a varied level output to said second capstan drive device.

19. Apparatus according to claim 18; in which each of said first and second capstan drive devices includes a 3-phase AC motor, and each of said varied level outputs from said first and second set of shift registers is a 3-phase AC signal.

* * * * *